United States Patent
Burns Barreto et al.

(10) Patent No.: US 12,415,913 B2
(45) Date of Patent: Sep. 16, 2025

(54) HETEROPHASIC PROPYLENE COPOLYMERS, METHODS, FILMS, AND ARTICLES THEREOF

(71) Applicant: Braskem S.A., Camaçari (BR)

(72) Inventors: Luiza Burns Barreto, São Paulo (BR); Antonio Carlos Quental, São Paulo (BR); Gerd Lohse, Pittsburgh, PA (US)

(73) Assignee: Braskem S.A., Camaçari (BR)

( * ) Notice: Subject to any disclaimer, the term of this patent is extended or adjusted under 35 U.S.C. 154(b) by 801 days.

(21) Appl. No.: 17/422,365

(22) PCT Filed: Jan. 13, 2020

(86) PCT No.: PCT/IB2020/020005
§ 371 (c)(1),
(2) Date: Jul. 12, 2021

(87) PCT Pub. No.: WO2020/144544
PCT Pub. Date: Jul. 16, 2020

(65) Prior Publication Data
US 2022/0112365 A1  Apr. 14, 2022

Related U.S. Application Data

(60) Provisional application No. 62/791,329, filed on Jan. 11, 2019.

(51) Int. Cl.
| | | |
|---|---|---|
| C08L 23/14 | (2006.01) | |
| B29C 48/00 | (2019.01) | |
| B29C 48/10 | (2019.01) | |
| B29K 23/00 | (2006.01) | |
| B29K 105/16 | (2006.01) | |
| B29L 23/00 | (2006.01) | |
| B32B 5/02 | (2006.01) | |
| B32B 15/085 | (2006.01) | |
| B32B 27/08 | (2006.01) | |
| B32B 27/12 | (2006.01) | |
| B32B 27/32 | (2006.01) | |
| C08J 5/18 | (2006.01) | |

(52) U.S. Cl.
CPC .......... *C08L 23/14* (2013.01); *B29C 48/0018* (2019.02); *B29C 48/022* (2019.02); *B29C 48/10* (2019.02); *B32B 5/022* (2013.01); *B32B 5/024* (2013.01); *B32B 15/085* (2013.01); *B32B 27/08* (2013.01); *B32B 27/12* (2013.01); *B32B 27/32* (2013.01); *C08J 5/18* (2013.01); *B29K 2023/14* (2013.01); *B29K 2105/16* (2013.01); *B29L 2023/001* (2013.01); *B32B 2250/02* (2013.01); *B32B 2307/54* (2013.01); *C08J 2323/14* (2013.01); *C08J 2423/14* (2013.01); *C08L 2203/16* (2013.01); *C08L 2205/025* (2013.01); *C08L 2308/00* (2013.01)

(58) Field of Classification Search
CPC .............. C08L 23/14; C08L 2205/025; C08L 2308/00; B29C 48/022; B29C 48/10; B29C 48/018; B29K 2105/16; B32B 5/022; B32B 5/024; B32B 15/085; B32B 27/08; B32B 27/12; B32B 27/32; B32B 2250/02; B32B 2307/54; C08J 5/18; C08J 2423/14; C08J 2323/14
See application file for complete search history.

(56) References Cited

U.S. PATENT DOCUMENTS

2014/0155547 A1   6/2014   Gahleitner et al.

FOREIGN PATENT DOCUMENTS

| EP | 2796501 A1 | 10/2014 | |
|---|---|---|---|
| EP | 2989161 A1 | 3/2016 | |
| WO | 2013092615 A1 | 6/2013 | |
| WO | 2014173533 A1 | 10/2014 | |
| WO | WO-2017085195 A1 * | 5/2017 | .............. C08F 2/001 |
| WO | WO-2018077663 A1 * | 5/2018 | .............. C08K 5/01 |

OTHER PUBLICATIONS

International Search Report issued in corresponding International Application No. PCT/IB2020/020005; mailed Jul. 1, 2020 (6 pages).
Written Opinion of the International Searching Authority issued in corresponding International Application No. PCT/IB2020/020005; dated Jul. 1, 2020 (7 pages).
Communication pursuant to Rule 164(2)(b) and Article 94(3) EPC issued in corresponding European Patent Application No. 20 702 911.7, dated Mar. 13, 2024, (23 pages).

* cited by examiner

*Primary Examiner* — Camie S Thompson
(74) *Attorney, Agent, or Firm* — Osha Bergman Watanabe & Burton LLP

(57) ABSTRACT

Heterophasic propylene copolymer compositions may include a polymer matrix of a random propylene copolymer and an elastomeric copolymer dispersed in the polymer matrix in an amount ranging from about 10 to 35 wt. %, relative to the weight of the composition. The random propylene copolymer may include one or more comonomers in an amount ranging from about 0.5 to 8.0 wt. % of the random propylene copolymer. The elastomeric copolymer may include propylene and one or more comonomers, where the one or more comonomers are present in an amount ranging from about 15 to 60 wt. % of the elastomeric copolymer. Films may be formed from heterophasic propylene copolymer compositions. Methods of preparing heterophasic propylene copolymer compositions may include performing a multistage polymerization.

38 Claims, No Drawings

HETEROPHASIC PROPYLENE COPOLYMERS, METHODS, FILMS, AND ARTICLES THEREOF

BACKGROUND

Plastic films are widely used for many applications in a variety of industries, including packaging, construction, landscaping, and electronics. These films are generally manufactured by the process of blown film extrusion.

In blown film extrusion, an extruder forces a molten polymer through an annular die, forming a tube. This tube is inflated with compressed air to form a "bubble" that is subsequently cooled and drawn up by nip rolls. During this cooling step, the resin starts to crystallize and solidify, resulting in the tube becoming stable and changing the film appearance from transparent to translucent. This point in the process is called the "frost line". Various properties of the resulting film, such as the orientation and thickness, are highly dependent upon both the blowup ratio (ratio of the final tube diameter to the ratio of the die) and the drawdown ratio (ratio of the velocity of the film at the nip rolls to the average melt velocity at the die exit).

The quality of the resulting film depends greatly on the stability of the bubble that is formed during the process, which is highly dependent on both the process conditions and the nature of the polymer that is used. Poor control of process parameters, such as air flow, polymer feeding, temperatures, and draw ratio, can lead to bubble instability through phenomena such as draw resonance, helical instability, bubble sag, bubble tear, and bubble flutter. However, such events can generally be prevented through engineering measures.

By contrast, the bubble instability that can arise from the inherent properties of a polymer is more difficult to overcome. For instance, the use of traditional polypropylene in blown film extrusion is particularly challenging because its melt strength leads to very poor bubble stability.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to heterophasic propylene copolymer compositions that may include a polymer matrix of a random propylene copolymer that includes one or more comonomers in an amount ranging from about 0.5 to 8.0 wt. % of the random propylene copolymer; and an elastomeric copolymer dispersed in the polymer matrix in an amount ranging from about 10 to 35 wt. %, relative to the weight of the composition, where the elastomeric copolymer contains propylene and one or more comonomers.

In another aspect, embodiments disclosed herein relate to heterophasic propylene copolymer compositions that have a xylene cold soluble content, measured according to ISO 16152, ranging from about 18 to 40 wt. %, and wherein the composition has a melting temperature ($T_m$), as determined by differential scanning calorimetry (DSC), that is in accordance with the equation: $T_m \leq 150-(0.23 \times XCS)$, where XCS is the xylene cold soluble fraction of the composition.

In another aspect, embodiments disclosed herein relate to heterophasic propylene copolymer compositions that have a flexural modulus defined by the equation: FM<1000−75B, where FM is the flexural modulus of the composition, as measured according to ISO 178, and B is defined by the equation: $B=((MFR_r/MFR_c)^{0.213}-1)/C+1$, where $MFR_r$ is the melt flow rate of the random propylene copolymer and $MFR_c$ is the melt flow rate of the heterophasic propylene copolymer, measured according to ISO 1133 at 230° C. and under a load of 2.16 kg, and C is the amount of elastomer present in the heterophasic propylene copolymer, in its fractional form In another aspect, embodiments disclosed herein relate to films that include a heterophasic propylene copolymer composition that contains a polymer matrix of a random propylene copolymer including one or more comonomers in an amount ranging from about 0.5 to 8.0 wt. % of the random propylene copolymer; and an elastomeric copolymer dispersed in the polymer matrix in an amount ranging from about 10 to 35 wt. %, relative to the weight of the composition, where the elastomeric copolymer contains propylene and one or more comonomers.

In another aspect, embodiments described herein relate to articles that include a film thermolaminated to a substrate, where the film contains a heterophasic propylene copolymer composition.

In a further aspect, embodiments described herein relate to methods of preparing heterophasic propylene copolymer compositions by performing a multistage polymerization.

Other aspects and advantages of the claimed subject matter will be apparent from the following description and the appended claims.

DETAILED DESCRIPTION

In one aspect, one or more embodiments disclosed herein relate to heterophasic propylene copolymer (HECO) compositions that comprise a polymer matrix of a random propylene copolymer and an elastomeric copolymer that is dispersed therein. In some embodiments, the polymer matrix may be a random propylene copolymer and the elastomeric copolymer may comprise propylene and one or more comonomers.

In another aspect, one or more embodiments of the present disclosure relate to films that comprise a HECO composition that contains an elastomeric copolymer that is dispersed in a random propylene copolymer matrix.

In a further aspect, one or more embodiments of the present disclosure relate to articles that comprise a film that may be thermolaminated to a substrate, where the film comprises a HECO composition that contains an elastomeric copolymer that is dispersed in a random propylene copolymer matrix.

Compositions in accordance with the present disclosure may possess a balance of physical properties that render them highly suited for producing films by blown film extrusion. Such compositions are, therefore, highly advantageous over traditional propylene compositions that generally provide poor bubble stability and, thus, low quality films.

Compositions

One or more embodiments of the present disclosure are directed to HECO compositions that comprise a propylene-based matrix polymer and an elastomer phase, where the elastomer phase is dispersed in the matrix polymer. In some embodiments, the HECO compositions may comprise the elastomer phase in an amount ranging from 10 to 35% by weight (wt. %). For example, the HECO composition may have the elastomer phase in amount ranging from a lower limit of any of 10, 15, or 20 wt. % to an upper limit of any of 25, 30, or 35 wt. %, where any lower limit can be used in combination with any upper limit.

Polypropylene-based matrix polymers may comprise a random propylene copolymer that may, in some embodiments, contain one or more comonomers in an amount ranging from about 0.5 to 8.0 wt. %, relative to the total weight of the random propylene copolymer. In some embodiments, the matrix polymer may comprise one or more of the comonomers in an amount ranging from a lower limit of any of 0.5, 1, 2, 3 or 4 wt. % to an upper limit of any of 4, 5, 6, 7, or 8 wt. %, where any lower limit can be used in combination with any upper limit. In one or more embodiments, the comonomers of the matrix polymer may be selected from ethylene, butene, and higher α-olefins. In particular embodiments, the comonomers may be selected from the group consisting of ethylene and butene.

The elastomer phase of the heterophasic propylene copolymer compositions may be, for example, an elastomeric copolymer. The elastomeric copolymer may be a propylene copolymer that comprises propylene and one or more comonomers. In one or more embodiments, the comonomers of the elastomeric copolymer may be one or more selected from a group consisting of ethylene, butene, and higher α-olefins. In particular embodiments, the comonomers may be selected from the group consisting of ethylene and butene. The elastomeric copolymer may comprise the one or more comonomers in an amount ranging from 15 to 60 wt. %, relative to the weight of the elastomeric copolymer. In some embodiments, the elastomeric copolymer may comprise the one or more comonomers in an amount ranging from a lower limit of any of 15, 20, 25, or 30 wt. % to an upper limit of any of 35, 45, 50, 55, or 60 wt. %, where any lower limit can be used with any upper limit.

In one or more embodiments, HECO compositions in accordance with the present disclosure may have a total comonomer content ranging from about 4 to 25 wt. %, as determined by IR spectroscopy, relative to the total weight of the composition. In particular embodiments, HECO compositions may have a total comonomer composition ranging from a lower limit of any of 4, 5, 7, or 10 wt. % to an upper limit of any of 12, 15, 20, or 25 wt. %, where any lower limit can be used with any upper limit.

HECO compositions in accordance with one or more embodiments of the present disclosure may have a polymer matrix and/or an elastomer phase that have either a bimodal or multimodal molecular weight distribution. HECO compositions in accordance with some embodiments of the present disclosure may have a polymer matrix and/or an elastomer phase that have either a bimodal or multimodal composition.

HECO compositions in accordance with the present disclosure may optionally further comprise one or more additives that modify various physical and/or chemical properties of the composition. Such additives may be selected from, for example, flow lubricants, antistatic agents, clarifying agents, nucleating agents, beta-nucleating agents, slippage agents, antioxidants, antacids, light stabilizers, IR absorbers, silica, titanium dioxide, organic dyes, organic pigments, inorganic dyes, inorganic pigments, and combinations thereof. One of ordinary skill in the art will appreciate, with the benefit of this disclosure, that the choice of additive may be dependent upon the intended use of the composition and/or articles produced therefrom. It will also be appreciated that such additives are not limited to those described above.

HECO compositions in accordance with the present disclosure may optionally further comprise one or more organic or inorganic fillers. Such fillers may be selected, for example, from the group consisting of talc, silica, mica, carbonates, chalk, clay, mica, glass, carbon fibers, and combinations thereof.

HECO compositions that are in accordance with one or more embodiments of the present disclosure may be visbroken. In some embodiments, the composition may be visbroken by reactive extrusion. In particular embodiments, the HECO composition may be visbroken by a suitable visbreaking agent, such as an inorganic or organic peroxide. Suitable visbreaking agents of one or more embodiments may be selected from the group comprising 2,5-dimethyl-2,5-di(t-butylperoxy)hexane, 2,5-dimethyl-2,5-di(t-butylperoxy)hexyne-3,3,6,6,9,9-pentamethyl-3-(ethyl acetate)1,2,4,5-tetraoxy cyclononane, t-butyl hydroperoxide; hydrogen peroxide; dicumyl peroxide; t-butyl peroxy isopropyl carbonate; di-t-butyl peroxide; p-chlorobenzoyl peroxide; dibenzoyl diperoxide; t-butyl cumyl peroxide; t-butyl hydroxyethyl peroxide, di-t-amyl peroxide; and 2,5-dimethylhexene-2,5-diperisononanoate, and others.

Properties of Compositions

HECO compositions according to the present disclosure will generally possess physical properties suitable for the intended use of the composition and the films and/or articles produced therefrom. One of ordinary skill in the art will, with the benefit of this present disclosure, appreciate that altering the relative amounts and/or identities of the components of a polymer composition will influence the resulting properties of the composition.

In one or more embodiments, HECO compositions in accordance with the present disclosure may exhibit a melt flow rate, measured according to ISO 1133 at 230° C. under a 2.16 kg load, that ranges from about 0.3 to 25 g/10 min. For example, HECO compositions may exhibit a melt flow rate, measured according to ISO 1133 at 230° C. under a 2.16 kg load, having a lower limit of any of 0.3, 0.6, 1, 2, 5, or 10 g/10 min to an upper limit of any of 10, 12, 15, 20, or 25 g/10 min, where any lower limit can be used in combination with any upper limit.

In one or more embodiments, HECO compositions in accordance with the present disclosure may possess a xylene cold soluble content, measured according to ISO 16152, that ranges from about 18 to 40 wt. %. For example, HECO compositions may have a xylene cold soluble content having a lower limit of any of 18, 20, or 22 wt. % and an upper limit of any of 25, 30, 35, or 40 wt. %, where any lower limit can be used in combination with any upper limit.

In one or more embodiments, HECO compositions in accordance with the present disclosure may exhibit a melting temperature ($T_m$, in degrees Celsius), as determined by differential scanning calorimetry (DSC), that is in accordance with equation (I):

$$T_m \leq 150 - (0.23 \times XCS) \qquad (I)$$

where XCS (in % terms) is the xylene cold soluble fraction of the composition.

In one or more embodiments, HECO compositions in accordance with the present disclosure may exhibit a flexural modulus that is in accordance with equation (II):

$$FM < 1000 - 75B \qquad (II)$$

where FM is the flexural modulus (in MPa) of the composition, as measured according to ISO 178, and B is defined by equation (III):

$$B = (((MFR_r/MFR_c)^{0.213} - 1)/C) + 1 \qquad (III)$$

where $MFR_r$ is the melt flow rate (in g/10 min) of the random propylene copolymer and $MFR_c$ is the melt flow rate (in g/10 min) of the heterophasic propylene copolymer, measured according to ISO 1133 at 230° C. and under a load of 2.16 kg, and C is the fractional amount of elastomer present in the heterophasic propylene copolymer.

In one or more embodiments, HECO compositions in accordance with the present disclosure may have a haze that is in accordance with equation (IV):

$$\text{Haze} \leq 40 IV_{XCS} - 55 \qquad (IV)$$

where $IV_{XCS}$ is the intrinsic viscosity (in dL/g), measured according to ASTM D445, of the xylene cold soluble fraction.

In one or more embodiments, HECO compositions in accordance with the present disclosure may exhibit a flexural modulus, measured in accordance with ISO 178, that ranges from about 200 to 900 MPa. In particular embodiments, HECO compositions may exhibit a flexural modulus that ranges from about 300 to 600 MPa.

In one or more embodiments, HECO compositions in accordance with the present disclosure may exhibit a polydispersity index that ranges from about 2.5 to 5. The polydispersity index (PI) represents the amplitude of the molecular weight distribution and it may be determined using an ARES G2 parallel plates (25 mm radius) rheometer from TA Instruments. To obtain the PI value, the storage modulus (G') and the loss modulus (G") may be obtained at 200° C. (isothermal) with the plates operating at an oscillation frequency increasing from 0.1 rad/s to 500 rad/s. From the intersection between the storage modulus and the loss modulus, the crossover (CO) point, which is directly correlated to the molecular weight distribution of the polymer, may be obtained. The CO point may be used to calculate PI through the following equation: $PI=10^5/(CO)$.

In one or more embodiments, HECO compositions in accordance with the present disclosure may exhibit a melt strength of about 7 cN or more, or 10 cN or more in more particular embodiments. The melt strength is the measure of the extensional viscosity of the material and it is directly correlated with bubble stability during blown film extrusion. The measurement to obtain this property may be carried out in a Rheograph 25 connected to a Rheotens 71.97 from Gottfert. The polymer is heated up to 190° C. and pressed out with a piston speed of 0.5 mm/s through a die with L/D ratio 20/2. The wheels of the Rheotens have an initial speed of 10 mm/s and have an acceleration rate of 60 mm/s². The melt strength is the maximum force perceived by the wheels during acceleration.

In one or more embodiments, HECO compositions in accordance with the present disclosure may exhibit a Sealing Strength, measured in accordance with ASTM F1921, ranging from about 1.0 to 5.0 N.

Methods of Preparing Compositions

HECO compositions in accordance with the present disclosure may be prepared by any suitable method known in the art. In one or more embodiments, the method of preparing the HECO composition may include gas-phase polymerization. In one or more embodiments, HECO compositions may be produced by a multistage polymerization that utilizes at least two reactors. One reactor, the first in some embodiments, may be a gas phase or loop-slurry reactor. This reactor may be used to produce the polymer matrix. Other reactors may be gas phase reactors and may produce the elastomer phase.

In one or more embodiments, HECO compositions in accordance with the present disclosure may be prepared in a sequential polymerization process wherein the propylene-based matrix polymer is prepared first, and the elastomer phase is prepared afterwards.

Any suitable catalyst may be used in the preparation of the HECO compositions of the present disclosure. In one or more embodiments, HECO compositions may be prepared with a catalyst such as Ziegler-Natta, metallocene, or chromium catalysts. In particular embodiments, HECO compositions in accordance with the present disclosure may be prepared using a Ziegler-Natta catalyst. Examples of the Ziegler-Natta catalysts that may be utilized include, but are not limited to, one or more phthalate-based catalysts, diether-based catalysts, succinate-based catalysts, and combinations thereof. Particular embodiments of the present disclosure utilize Ziegler-Natta catalytic systems that are not phthalate-based.

In one or more embodiments, HECO compositions in accordance with the present disclosure may be prepared using a co-catalyst in addition to a catalyst. In one or more embodiments, the co-catalyst may be triethyl aluminum.

In one or more embodiments, HECO compositions in accordance with the present disclosure may be prepared using an electron donor in addition to a catalyst and a co-catalyst. In one or more embodiments, the electron donor may be selected from, but not limited to, dicyclopentyldimethoxysilane, cyclohexylmethyldimethoxysilane, diisopropyldimethoxysilane, di-t-butyldimethoxysilane, cyclohexylisopropyldimethoxy silane, n-butylmethyldimethoxysilane, tetraethoxysilane, 3,3,3 trifluoropropylmethyldimethoxysilane, mono and dialkylaminotrialkoxysilanes, and combinations thereof.

In one or more embodiments, a catalyst system may comprise a catalyst and, optionally, one or more co-catalysts and electron donors. In some embodiments, the catalyst system may be introduced at the beginning of the polymerization of propylene and one or more comonomers and is transferred with the resulting propylene-based matrix polymer to a copolymerization reactor where it serves to catalyze the gas phase copolymerization of propylene and one or more comonomers to produce the elastomer phase.

As would be apparent to one of ordinary skill in the art with the benefit of the present disclosure, HECO compositions in accordance with the present disclosure may be prepared by any suitable method, not only those described above.

In one or more embodiments, the addition of additives and/or inorganic fillers to the HECO compositions may be accomplished by using any suitable method including, for example, dry blending and melt blending methods. By mixing components subsequent to synthesis, each component may be purified to specified standards and then combined to generate the final composition while minimizing the presence of reactants and degradation products. In embodiments prepared from multiple components, such as additives, a subset of the components may be combined by melt mixing followed by subsequent mixing steps, or all components may be melt mixed simultaneously.

Films and Articles

As will be apparent to one of ordinary skill in the art having the benefit of the present disclosure, films may be formed from any of the above-mentioned HECO compositions. The films may have a monolayer or a multilayer structure and may be produced by any suitable manufacturing process. In one or more embodiments, films in accordance with the present disclosure may be produced by either blown film extrusion or cast film extrusion.

Articles in accordance with the present disclosure may be produced by laminating one or more of the above-mentioned films with to one or more other film layers and/or one or more substrates. In particular embodiments, articles may comprise an above-mentioned film that is thermolaminated to a substrate. In some embodiments, such substrates may be selected from the group consisting of plastic films and woven, non-woven, and metallic materials.

The properties of the articles formed according to one or more embodiments of the present disclosure will generally be suitable for the articles intended use. One of ordinary skill in the art will, with the benefit of this present disclosure, appreciate that altering the relative amounts and/or identities of the components of a polymer composition will influence the properties of an article formed therefrom.

EXAMPLES

Example 1: Sealing Strength—Cast Films

In this example, the sealing strength of inventive samples and commercial samples were measured and compared. Samples 1 to 6 were prepared according to the present disclosure in a two steps polymerization process using a Ziegler-Natta catalyst. All samples were compounded with antioxidants prior the film production. Table 1 shows characteristics of the inventive samples.

TABLE 1

| | Inventive Samples characteristics | | | | | | |
|---|---|---|---|---|---|---|---|
| | Unit | Sample 1 | Sample 2 | Sample 3 | Sample 4 | Sample 5 | Sample 6 |
| XCS | Wt. % | 25 | 23 | 22 | 22 | 25 | 23 |
| Tm | ° C. | 143 | 144 | 144 | 144 | 144 | 142 |
| Flexural Modulus | MPa | 435 | 453 | 492 | 544 | 507 | 450 |
| MFR | g/10 min | 0.56 | 0.51 | 0.66 | 1 | 1 | 0.55 |
| PI | | 3.5 | 3.2 | 3.4 | 3.4 | 3.3 | 3.7 |

A film was obtained by a Cast film extrusion process. Table 2 shows the process conditions.

TABLE 2

| Process conditions - Cast Film | | |
|---|---|---|
| Chill roll temperature | ° C. | 20 |
| Thickness | μm | 50 |
| Extrusion temperature | ° C. | 200-240 |
| Rotation screw | rpm | 30 |

Cast films were formed with each sample and comparative sample, and the sealing strength was measured according to ASTM F1921. The results are shown in Table 3. Comparative Sample 1 is a commercial random copolymer from Braskem (PRB 0131) with a melt flow rate of 1.3 g/10 min measured according ASTM D1238 (230° C./2.16 Kg). Comparative Sample 2 is a commercial terpolymer from Braskem (Symbios 4102) with a melt flow rate of 5.5 g/10 min measured according ASTM D1238 (230° C./2.16 Kg).

TABLE 3

| Sealing strength | | |
|---|---|---|
| | Sealing strength (N) | Melting Temperature (° C.) |
| Sample 1 | 3.4 | 143 |
| Sample 2 | 2.5 | 144 |
| Sample 3 | 2.7 | 144 |
| Sample 4 | 2.7 | 144 |
| Sample 5 | 2.4 | 144 |
| Sample 6 | 3.6 | 142 |
| Comparative 1 | 2.1 | 144 |
| Comparative 2 | 2.1 | 135 |

It is observed that the inventive samples 1 to 6 presented better sealing strength when compared to the random copolymer and terpolymer (Comparative 1 and 2). Inventive Sample 6 also showed better sealing strength among the inventive samples. Additionally, the melting point of all inventive samples are higher than terpolymer one, which represent a higher thermal resistance for the final article.

Example 2: Blown Film Formation

The objective of this example was to evaluate qualitatively the bubble stability during the blown film extrusion process. A heterophasic propylene composition sample (Inventive sample 6 of Example 1, as discussed above) was produced in a two-step polymerization process using a Ziegler-Natta catalyst.

A film was obtained by a blown film extrusion process. Table 4 shows the process conditions

TABLE 4

| Process conditions - Blown Film | | |
|---|---|---|
| Die diameter | mm | 200 |
| Die gap | mm | 1.2 |
| Blow up ratio | — | 2.5 |
| Thickness | μm | 20 |
| Extrusion temperature | ° C. | 220 |

The process occurred without any drawbacks. The bubble formed during the process showed excellent stability without presenting any problem as draw resonance, helical instability, bubble sag and tear, etc.

Example 3: Mechanical and Sealing Properties

Blown films were prepared with Inventive sample 6 and commercially available grades in order to compare mechanical and sealing properties Films were prepared by blown film extrusion using the process conditions presented on Table 4 above.

Comparative sample 3 is a random copolymer from Braskem (DRSP10.01) presenting a melt flow rate of 1.0 g/10 min Comparative sample 4 is an impact copolymer available from Braskem (Inspire 137) presenting a melt flow rate of 0.8 g/10 min.

Mechanical and sealing properties were than evaluated. The results are shown on Table 5.

TABLE 5

Results of mechanical and sealing properties

| Property | Unit | Standard | Inventive Sample 6 | Comparative 3 | Comparative 4 |
|---|---|---|---|---|---|
| Tensile Strength at Break MD | MPa | ASTM D882 | 95 | 68 | 69 |
| Elongation at Break MD | % | ASTM D882 | 667 | 654 | 722 |
| Tensile Strength at Break CD | MPa | ASTM D882 | 47 | 27 | 40 |
| Elongation at Break CD | % | ASTM D882 | 1103 | 485 | 884 |
| Elmendorf tear resistance CD | gf | ASTM D1922 | 929 | 56 | 144 |
| Elmendorf tear resistance MD | gf | ASTM D1922 | 13 | 7 | 9 |
| Secant Modulus 1% CD | MPa | ASTM D882 | 572 | 774 | 856 |
| Secant Modulus 1% MD | MPa | ASTM D882 | 530 | 855 | 880 |
| Sealing Strength | N | ASTM F1921 | 2.2 | 1.5 | 1.8 |

The inventive sample 6 presented superior sealing and mechanical properties. Inventive sample 6 also showed better balance of properties in cross direction (CD) and Machine Direction (MD).

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A heterophasic propylene copolymer composition, comprising:
   a heterophasic propylene copolymer, comprising:
      a polymer matrix of a random propylene copolymer that comprises one or more comonomers in an amount ranging from about 0.5 to 8.0 wt. % of the random propylene copolymer; and
      an elastomeric copolymer dispersed in the polymer matrix in an amount ranging from about 10 to 35 wt. %, relative to the weight of the composition, the elastomeric copolymer comprising propylene and one or more comonomers, the one or more comonomers being present in an amount ranging from about 15 to 60 wt. % of the elastomeric copolymer,
   wherein the composition has a total comonomer content ranging from about 4 to 25 wt. %, and
   wherein the composition has a melt flow rate, measured according to ISO 1133 at 230° C. under a 2.16 kg load, ranging from about 0.3 to 1.0 g/10 min,
   wherein the composition has a melting temperature ($T_m$, in degrees Celsius), as determined by differential scanning calorimetry (DSC), in accordance with equation (I):

$$T_m \leq 150 - (0.23 \times X_{CS}) \tag{I}$$

where $X_{CS}$ is the xylene cold soluble fraction (in % terms) of the composition.

2. The composition of according to claim 1, wherein the composition has a xylene cold soluble content, measured according to ISO 16152, ranging from about 18 to 40 wt. %.

3. The composition of claim 1, wherein the composition has a flexural modulus as defined by equation (II):

$$FM < 1000 - 75B \tag{II}$$

where FM is the flexural modulus of the composition, as measured according to ISO 178, and B is defined by equation (III):

$$B = (((MFR_r/MFR_c)^{0.213} - 1)/C) + 1 \tag{III}$$

where $MFR_r$ is the melt flow rate of the random propylene copolymer and $MFR_c$ is the melt flow rate of the heterophasic propylene copolymer, measured according to ISO 1133 at 230° C. and under a load of 2.16 kg, and C is the amount of elastomer present in the heterophasic propylene copolymer, in its fractional form.

4. The composition according to claim 1, wherein the composition has a haze that is in accordance with equation (IV):

$$Haze \leq 40 IV_{XCS} - 55 \tag{IV}$$

where $IV_{XCS}$ is the intrinsic viscosity, measured according to ASTM D445, of the xylene cold soluble fraction.

5. The composition according to claim 1, wherein one or more of the comonomers of the polymer matrix are selected from the group consisting of ethylene and C4 and higher α-olefins.

6. The composition according to claim 5, wherein the one or more comonomers of the polymer matrix are selected from the group consisting of ethylene and butene.

7. The composition according to claim 1, wherein one or more of the comonomers of the elastomeric copolymer are selected from the group consisting of ethylene and C4 and higher α-olefins.

8. The composition according to claim 7, wherein the one or more comonomers of the elastomeric copolymer are selected from the group consisting of ethylene and butene.

9. The composition of claim 1, wherein the composition has a flexural modulus, measured in accordance with ISO 178, ranging from about 200 to 900 MPa.

10. The composition of claim 9, wherein the flexural modulus is of the range of about 300 to 600 MPa.

11. The composition of claim 1, wherein the composition has a polydispersity index, ranging from about 2.5 to 5.

12. The composition of claim 1, wherein the composition has a melt strength of at least 7 cN.

13. The composition of claim 1, wherein the composition has a Sealing Strength, measured in accordance with ASTM F1921, ranging from about 1.0 to 5.0 N.

14. The composition of claim 1, wherein the composition further comprises one or more additives.

15. The composition of claim 14, wherein the one or more additives are selected from the group consisting of flow lubricants, antistatic agents, clarifying agents, nucleating agents, beta-nucleating agents, slipping agents, antioxidants, antacids, light stabilizers, IR absorbers, silica, titanium dioxide, silicon dioxide, organic dyes, organic pigments, inorganic dyes, inorganic pigments, and combinations thereof.

16. The composition of claim 1, wherein the composition further comprises one or more organic or inorganic fillers.

17. The composition of claim 16, wherein the one or more fillers are selected from the group consisting of talc, silica, mica, carbonates, chalk, clay, mica, glass, carbon fibers, and combinations thereof.

18. The composition of claim 1, wherein one or more of the polymer matrix and the elastomeric copolymer have a bimodal or multimodal molecular weight distribution.

19. The composition of claim 1, wherein the composition is visbroken.

20. The composition of claim 19, wherein the composition is visbroken by reactive extrusion.

21. The composition of claim 19, wherein the composition is visbroken by a visbreaking agent that comprises an inorganic or organic peroxide.

22. A film, comprising the composition of claim 1.

23. The film of claim 22, wherein the film has a monolayer structure.

24. The film of claim 22, wherein the film has a multilayer structure.

25. The film of claim 22, wherein the film is produced by blown film extrusion or cast film extrusion.

26. An article, comprising the film of claim 22, wherein the film is thermolaminated to a substrate.

27. The article of claim 26, wherein the substrate is one or more of the group consisting of woven materials, non-woven materials, metallic materials, and plastic films.

28. A method, comprising:
performing a multistage polymerization to prepare the composition of claim 1.

29. The method according to claim 28, wherein two or more reactors are used in the multistage polymerization.

30. The method according to claim 28, wherein a Ziegler-Natta catalyst is used in the polymerization.

31. The method according to claim 30, wherein the Ziegler-Natta catalyst is a non-phthalate based catalyst.

32. A method, comprising:
blow extruding the heterophasic propylene copolymer composition of claim 1.

33. A heterophasic propylene copolymer composition, comprising:
a heterophasic propylene copolymer, comprising:
a polymer matrix of a random propylene copolymer that comprises one or more comonomers in an amount ranging from about 0.5 to 8.0 wt. % of the random propylene copolymer; and
an elastomeric copolymer dispersed in the polymer matrix in an amount ranging from about 10 to 35 wt. %, relative to the weight of the composition, the elastomeric copolymer comprising propylene and one or more comonomers,
wherein the composition has a xylene cold soluble content, measured according to ISO 16152, ranging from about 18 to 40 wt. %,
wherein the composition has a melt flow rate, measured according to ISO 1133 at 230° C. under a 2.16 kg load, ranging from about 0.3 to 1.0 g/10 min, and
wherein the composition has a melting temperature ($T_m$), as determined by differential scanning calorimetry (DSC), in accordance with equation (I):

$$T_m \leq 150 - (0.23 \times XCS) \quad (I)$$

where XCS is the xylene cold soluble fraction of the composition.

34. The composition according to claim 33, wherein the elastomeric copolymer comprises the one or more comonomers in an amount ranging from about 15 to 60 wt. % of the elastomeric copolymer.

35. The composition according to claim 33, wherein the composition has a total comonomer content ranging from about 4 to 25 wt. % of the composition.

36. A heterophasic propylene copolymer composition, comprising:
a heterophasic propylene copolymer, comprising:
a polymer matrix of a random propylene copolymer that comprises one or more comonomers in an amount ranging from about 0.5 to 8.0 wt. % of the random propylene copolymer; and
an elastomeric copolymer dispersed in the polymer matrix in an amount ranging from about 10 to 35 wt. %, relative to the weight of the composition, the elastomeric copolymer comprising propylene and one or more comonomers,
wherein the composition has a flexural modulus as defined by equation (II):

$$FM < 1000 - 75B \quad (II)$$

where FM is the flexural modulus of the composition, as measured according to ISO 178, and B is defined by equation (III):

$$B = (((MFR_r/MFR_c)^{0.213} - 1)/C) + 1 \quad (III)$$

where $MFR_r$ is the melt flow rate of the random propylene copolymer and $MFR_c$ is the melt flow rate of the heterophasic propylene copolymer, measured according to ISO 1133 at 230° C. and under a load of 2.16 kg, and C is the amount of elastomer present in the heterophasic propylene copolymer, in its fractional form, wherein the composition has a melt flow rate, measured according to ISO 1133 at 230° C. under a 2.16 kg load, ranging from about 0.3 to 1.0 g/10 min, and wherein the composition has a melting temperature ($T_m$), as determined by differential scanning calorimetry (DSC), in accordance with equation (I):

$$T_m \leq 150-(0.23 \times X_{CS}) \qquad (I)$$

where XCS is the xylene cold soluble fraction of the composition.

37. The composition of claim 36, wherein the composition has a xylene cold soluble content, measured according to ISO 16152, ranging from about 18 to 40 wt. %.

38. A method, comprising:
blow extruding a heterophasic propylene copolymer composition having a melt strength of at least 7 cN.

* * * * *